J. A. GARDNER.
BEAN SORTER AND LIFTING HEAD.
APPLICATION FILED JUNE 22, 1914.
1,120,380.
Patented Dec. 8, 1914.
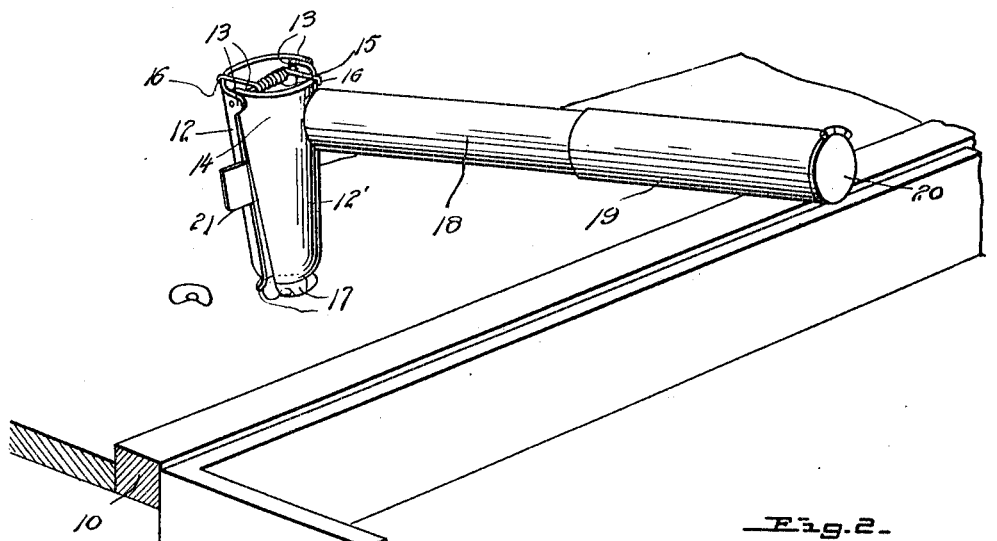
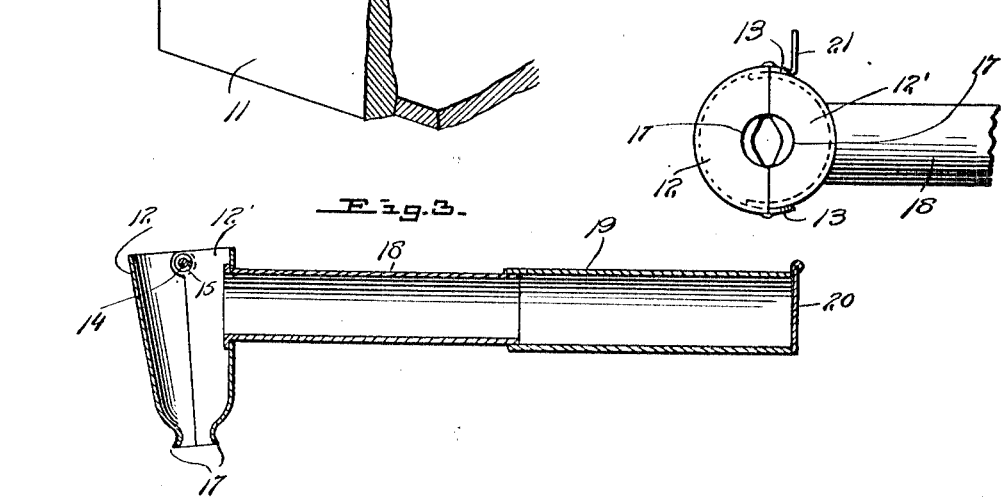
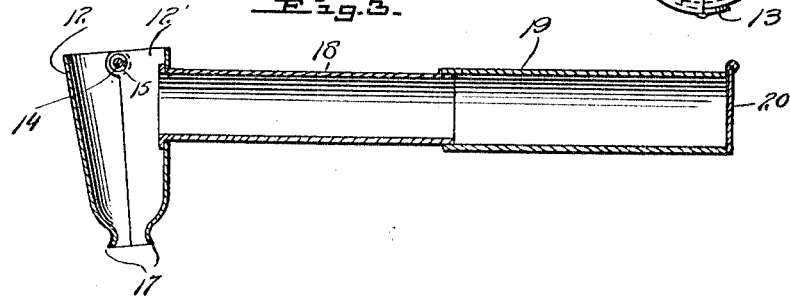
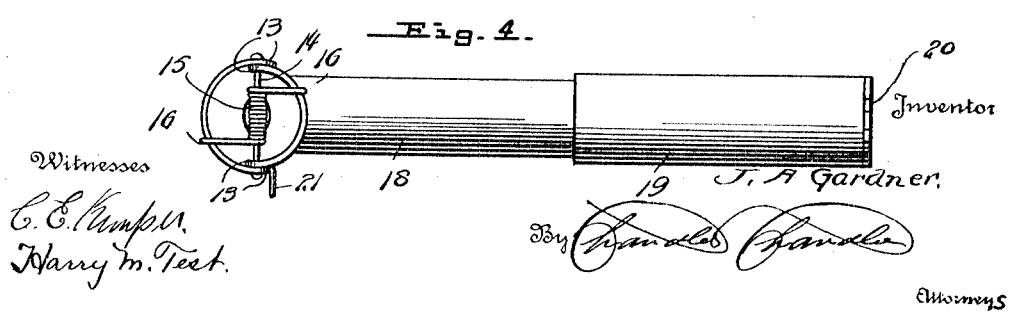
Witnesses
C. E. Kump
Harry M. Test
Inventor
J. A. Gardner
By [signature]
Attorneys
THE NORRIS PETERS CO., PHOTO-LITHO., WASHINGTON, D. C.

UNITED STATES PATENT OFFICE.

JAMES A. GARDNER, OF ALMA, MICHIGAN.

BEAN SORTER AND LIFTING HEAD.

1,120,380.  Specification of Letters Patent.  Patented Dec. 8, 1914.

Application filed June 22, 1914. Serial No. 846,614.

*To all whom it may concern:*

Be it known that I, JAMES A. GARDNER, a citizen of the United States, residing at Alma, in the county of Gratiot, State of Michigan, have invented certain new and useful Improvements in Bean Sorters and Lifting Heads; and I do hereby declare the following to be a full, clear, and exact description of the invention, such as will enable others skilled in the art to which it appertains to make and use the same.

This invention relates to improvements in bean sorters and particularly to devices for use in picking inferior or imperfect beans from a mass, and is an improvement on the construction set forth in U. S. Letters Patent issued to me May 26, 1914, No. 1,097,754.

The principal object of the invention is to provide a simple and novel device which is adapted to be held in the hand of the user, and which can be made to pick up the inferior beans and automatically deliver them into a convenient receptacle.

Another object is to provide a device of this character which is adjustable, and which is provided with means to deliver the beans to the receptacle without danger of the beans jumping from the receptacle when they strike the bottom thereof.

Other objects and advantages will be apparent from the following description, when taken in connection with the accompanying drawings.

In the drawings: Figure 1 is a perspective view showing my device in use. Fig. 2 is a bottom plan view of the bean engaging portion of the device. Fig. 3 is a vertical longitudinal sectional view through the device. Fig. 4 is a top plan view of the device.

Referring particularly to the accompanying drawings, 10 represents a tray from which beans are picked by hand, and 11 a suitable receptacle disposed close to the tray for receiving the inferior or imperfect beans which are picked from the tray.

My picking device comprises a vertical hollow head portion which is divided vertically into two sections 12 and 12' each section being provided with the perforated ears 13. The ears of one section register in overlapped relation with those of the other section and receive a transverse pivot pin 14 therethrough. A spring 15 is mounted on the pin and has its ends provided with the hooks 16 which engage over the upper edges of the respective sections. The lower ends of the sections 12 and 12' are bent away from each other, as indicated at 17, so as to readily slide on the beans to cause the sections to spread apart and permit the beans to pass upwardly into the head. At one side of the upper end of the head is connected a tube 18 which forms the handle of the device and is grasped in the hand of the user. The rear end of the tube is provided with an adjustable sleeve or tube 19 telescoped on the tube 18 and arranged to be moved back and forth to vary the length of the tube. In the outer end of the sleeve 19 is a door 20 hinged to the upper side of the sleeve and against which the beans strike when they roll down through the tube.

In the operation of the device, the tube 18 is grasped in the hand of the user and is held in such position that the head is disposed over the tray 10 and the discharge end of the tube 19 over the receptacle 11. By pressing the ends 17 onto an imperfect or inferior bean, the same will separate the sections and be forced up into the head. The act of picking up the inferior beans is continued, and as the beans enter the head, they will be forced up in a mass until they will flow over into the tube 18, and said overflow run down the tube and the sleeve 19, striking the door 20 which checks the force of the beans and permits them to drop gently into the receptacle. Thus the beans will be gently and positively delivered to the receptacle without danger of the beans jumping out of the receptacle when they strike the bottom thereof.

While I have shown the sections of the head held by a spring, it will be understood that the sections may be held together by the finger of the hand, and the sections swung apart when it is desired to empty the beans from the head. To facilitate this opening of the sections, I provide the edge of one of the sections intermediate its length with a projection 21 against which the finger or thumb of the hand which holds the device is engaged to swing the section away from the other section.

What is claimed is:

1. A bean sorting device comprising a hollow handle, and a hollow head mounted on the handle and consisting of a pair of pivotally connected sections resiliently held in engagement and adapted to be separated when engaged with a bean to permit the bean to enter the head.

2. A bean sorting device comprising a hollow conveying handle, and a hollow bean lifting head mounted on one end of the handle and communicating with the handle, said head being formed of movably connected sections, one of the sections having a projection, through the medium of which that section may be swung toward and away from the other section, for the purpose set forth.

3. A bean sorting device comprising a handle, a hollow bean lifting head mounted thereon, said head including pivoted sections, and a projection carried by one of the sections for engagement by the finger of the hand to move the said sections.

In testimony whereof, I affix my signature, in the presence of two witnesses.

JAMES A. GARDNER.

Witnesses:
Mrs. F. McKinney,
Clyde J. Creaser.

Copies of this patent may be obtained for five cents each, by addressing the "Commissioner of Patents, Washington, D. C."